Patented Nov. 26, 1946

2,411,665

UNITED STATES PATENT OFFICE 2,411,665

THERMOPLASTIC LACQUER AND METHOD OF PREPARING SAME

Jean B. Monier, Galt, Ontario, Canada

No Drawing. Application October 7, 1943, Serial No. 505,385. In Canada April 30, 1943

4 Claims. (Cl. 106—217)

This invention relates to improvements in lacquers and in the method of making the same and in the films produced from the lacquers and the primary object of the invention is to provide lacquers capable of producing films which will be tough, pliable and elastic, substantially unaffected by water, moisture, oils, greases, acids, gases, alkalis, the effects of sunlight and the atmosphere and which will have good dielectric strength and good conductance-inductance values. A further object is to provide lacquers capable of producing thermoplastic films and thermosetting films, which latter may, after evaporation of the solvent, be converted to an infusible, insoluble state. A still further object is to provide lacquer solutions which will be useful as impregnating agents and adhesives. Another object is to provide lacquer solutions which are stable, even after long standing. Still another object is to provide lacquers which may be used alone or in conjunction with felted, woven or spun material as electrical insulation. Various other objects and the advantages of the invention may be ascertained from the following description:

As to product, the invention consists, broadly speaking, in a lacquer, impregnating agent or adhesive comprising, as an essential ingredient thereof, an unsaturated carbohydrate derivative, the said derivative being either thermoplastic or thermosetting, admixed with one or more of the plasticizers, lubricants, extenders, hardening agents, accelerators, dyes, pigments, vulcanizing and other agents, solvents and diluents and other agents; and in the films and impregnations produced therefrom; and as to process the invention consists, broadly speaking, in mixing the non-solvent ingredients of the lacquer mixture, holding them under vacuum and at elevated temperature during a blending period and then dissolving the blended mixture in a suitable solvent and, in the case of lacquers including a thermosetting ingredient, heating the same, after evaporation of solvent, to render the lacquer film infusible and insoluble.

In greater detail, the invention consists in the features and combinations of features herein disclosed, together with all such modifications thereof and substitutions of equivalents therefor as are within the scope of the appended claims.

The aforesaid essential ingredient of the lacquers of this invention, hereinafter termed the "basic material," is selected from either of two types of carbohydrate derivatives, preferably derivatives of a cellulose such as cotton, wood pulp, wood flour or sawdust, but may be derivatives of starch or of a protein. One of these materials is a thermoplastic obtained by hydrogenating and ethylating the raw material until the same behaves as a paraffin and then dehydrogenating and ethylating the paraffin-like material until the same becomes unsaturated and behaves as a member of the olefine series, or of a higher series. The thermoplastic basic materials and the method of making them are disclosed in my copending application Serial No. 505,383, filed coincidently with this application. The other of the basic materials is a thermosetting material derived from the first material by treating the same with prepared hydrocarbon gas under pressure. The thermosetting basic materials and the method of making them are disclosed in my copending application Serial No. 505,384, filed coincidently with this application.

One manner of producing a thermoplastic basic material as aforesaid is as follows: A pure, sufficiently alkalized or ethylated cellulose, that is, one having substantially no free hydroxyl content, is hydrogenated by passing through the mass of alkali cellulose, at a pressure of 5 to 10 pounds p. s. i. superatmospheric and at room temperature, a current of dry hydrogen gas, preferably in the presence of an excess of an ethylating agent, for approximately one hour, or until the hydrogenation and ethylation attain the desired degree, as determined by a test showing the change taking place in the ethoxyl content, which should attain a substitution of between 48% and 50%. The degree of hydrogenation should be at least equal to 14% to 16% of the original hydrogen content. The ethylating agent may be either aliphatic or aromatic and is preferably a compound with a halogen or with sulphur. The ethylating agent may be used in vapour form, such as vapour of ethyl chloride or ethyl sulphate or ethyl benzene, and passed with the hydrogen; or the ethylating agent may be in liquid form, previously admixed with the alkali cellulose, for instance benzyl chloride or a higher alkyl halide such as n-propyl chloride, n-butyl chloride, n-hexyl chloride or n-amyl chloride. If the starting material has been ethyl cellulose or cellulose ether, the ethylating components of the mixture may be omitted if the hydroxyl substitution is approximately 50%. During the reaction, some halogenation of the alkali cellulose occurs if the ethylating component includes a halide.

The product resulting from the foregoing treatment is now mixed with any suitable proportion, for instance, an approximately equal weight, of an alcohol mixture containing a reagent having a reactive ethylenic group, and preferably containing a catalyst. The mixture now preferred is about 50% methyl alcohol and 50% ethyl alcohol, with about 25% to 30% of its weight of acetone, preferably in the form of its sodium compound, a suitable olefin and a catalyst. The proportions of pre-treated cellulose and alcohol are not significant as long as an excess of alcohol is present. The proportions of the alcohols in the mixture may vary between, say, 40% methyl to 60% ethyl, and 60% methyl to 40% ethyl, with preference for at least 50% ethyl content.

Since the result desired from treating the cellulosic material with an ethylenic body is an increase in the carbon content of the molecule and the removal of hydrogen atoms by substitution of olefin groups for hydroxyl and ethoxyl groups, it is desirable to use a body of as high molecular weight as is practicable. Olefins, such as hexylene, heptylene and octylene, have been found satisfactory, but it will be understood the process is not confined to the use of these olefins, nor even to olefins, as the use of members of the acetylene series is contemplated. Alternatively, one may use a high weight paraffin instead of an olefin.

The catalyst now preferred is ortho-phosphoric acid alone or admixed with one or more of the salts, such as the phosphates or sulphates, of heavy metals selected from groups III', IV' and VI' of the periodic system, for instance, chromium, copper, nickel, palladium and platinum, in amount of approximately 1% of the weight of the reaction mixture. Other acids and other metals which will promote hydrogenation and ethylation and will not be detrimental to the final product may be used, but sulphuric acid is to be avoided.

It has been found that satisfactory results are obtained by mixing the phosphoric acid and the olefin in the proportion of approximately 60% acid to 40% olefin and using an amount of this mixture equal to about 20% of the dry weight of the cellulosic material, but the proportions may be varied. The amount of acid as above is 12% on the cellulosic material but may be higher or may be as low as will permit of an efficient and high substitution of the ethoxyl and hydroxyl groups by olefin groups. The metal salts are preferably added at the time of, or after, the addition of the acid to the reaction mixture.

The reaction mixture is heated at a pressure of 25 to 50 pounds p. s. i. superatmospheric for approximately one hour, care being taken that the temperature does not rise above 25° to 30° C. At the end of this time the pressure is released and the reaction mixture is refluxed for approximately 2 hours at a temperature equal to, or slightly above, the highest boiling temperature of the alcohol. The exact period is determined by tests for the extent of substitution. Suitable tests are pH determination, viscosity and solubility and a calculation of the free hydroxyl groups, preferably by the acetylation method, which should show substantially no free groups. The pH should be between 11 and 12. The viscosity should be 600 to 700 centipoises in 5% concentration. A satisfactory substitution is indicated by a molecular refraction between 28 and 29.

During the refluxing, dehydrogenation occurs. The reaction is believed to be removal of two hydrogen atoms from the glucose residue, which may be regarded as a cellulosic monomer, and the splitting off of water from the alcohol with resultant formation of an unsaturated olefin which substitutes the hydrogen. If it is desired to avoid a change in the number of carbon atoms during dehydrogenation, secondary alcohol may be used instead of primary alcohol. Dehydogenation is facilitated by addition of 1% to 5% (based on the weight of the reaction mixture) of a selenium salt, such as the chloride. Other metals or salts known as dehydrogenation catalysts, which do not have undesirable reaction may be used.

It will be understood that during the treatment with alcohol and olefins, some aldehydization occurs by reason of conversion of alcohol to aldehyde (ketone in the case of secondary alcohol) and it is believed the aldehyde or ketone groups attach to some extent to the cellulosic molecule. It will further be understood that all the steps of hydrogenation, dehydrogenation and ethylation hereinbefore described are carried out with exclusion of air.

When the reaction has progressed to a suitable extent, as determined by one or more of the foregoing tests, the reaction mixture is subjected to a high vacuum until the mass is completely dehydrated.

A thermoplastic basic material suitable for use according to this invention, made from cotton linters as aforesaid, is identified as a substantially water-white, transparent solid having a specific gravity of 1.14 to 1.16; a softening point of approximately 110° C.; a melting point of approximately 135° C. and a molecular refraction of 28.62. Thermoplastic material made from wood pulp, wood flour or sawdust, as above, is yellowish to brown in colour and translucent to opaque and has other characteristics substantially the same as the material made from cotton. These thermoplastic materials are very flexible and have tensile strength, dielectric strength and conductance-inductance values superior to those of rubber. They are soluble in most alcohols, esters, ethers, ketones, hydrocarbon and chlorinated hydrocarbon solvents and in many mixed solvents but are insoluble in water, cyclohexanol, diacetone alcohol, ethyl ether, methyl Cellosolve, Carbitol, high flash naphtha, dipentene, turpentine, petroleum ether, hexane and Varsol. They are substantially unaffected by water, moisture, oils, greases, most acids, alkalis, gases, sunlight and oxygen. They are compatible with most natural resins and with oils such as castor, linseed, soyabean and cottonseed but not with large amounts of paraffin wax, ceresin or ozokerite, or with cellulose acetates or nitrates. They are further compatible with many synthetic resins, including all of the alcohol-soluble types, pure phenolics and alkyds, also with ester gums and with rubber.

One manner of producing a thermosetting basic material as previously referred to is as follows. A thermoplastic material produced as previously described is placed in an autoclave and heated to a temperature of approximately 150° C. until the material liquifies. During or after the heating, the material is placed under pressure of 50 to 75 pounds p. s. i. superatmospheric and an excess of a previously prepared hydrocarbon gas, which may be a single gas or a mixture of gases, is blown through the liquid mass, maintained under the pressure and at the temperature above stated, for approximately 3 hours, or for such time as is necessary to produce the desired vulcanizable primary product. The reaction temperature may be lower or higher than stated above, say, between 125° and 175° C. It will be understood that the time of reaction depends primarily upon the rate of hydrocarbon gas input and absorption, and to a lesser extent on the pressure and temperature. If the gas input is below the rate of possible absorption, the reaction will require a longer time. The gas input should be in excess of the possible absorption and the unabsorbed excess of gas may be recirculated through the reaction.

A sufficient extent of reaction is determined by tests for pH, specific gravity and by examination of samples for tensile strength and molecular refraction. The pH should be on the alkaline side and normally between 8 and 9 but may vary somewhat from this range, according to the hydrocarbon gas which has been combined. The specific gravity should be between 1.01 and 1.04, and the molecular refraction approximately 42.35. The practical test is to mill-dry a sample with sulphur, vulcanize it and then determine the tensile strength. This is conclusive as to the suitability of the product for the use to which it is to be put. If the specific gravity is too high, or the refraction lower than given or if the tensile strength is not sufficient, the reaction should be continued until the desired values are attained. It will be understood that the extent of reaction is not always the same but that the reaction is carried to a point at which the product is suitable for the use in view. The foregoing tests indicate a material suitable for general use.

The aforesaid previously prepared hydrocarbon gas is obtained, broadly speaking, by passing a body, or mixture of bodies, containing an alkyl or an alkylene radical, in contact with a catalyst at high temperature. The types of bodies thus contemplated for use are principally alcohols (including glycols and glycerols), aldehydes and ketones of the aliphatic series, also certain members of the aromatic series. The bodies now preferred are ethyl alcohol or methyl ethyl ketone or a mixture of them. According to the method now preferred, either of these bodies, or a mixture of them, preferably in 85% to 90% concentration, is vapourized (with exclusion of air) and the vapour is heated to approximately 450° C. The hot vapour is passed (with exclusion of air) in contact with a catalyst in a chamber heated to a temperature between 350° and 450° C. and then through a cooler maintained at a temperature of approximately 0° C. to separate unconverted alcohol (or ketone) from the gaseous hydrocarbons which have been produced. The hydrocarbons desired for reaction with the thermoplastic cellulose derivative are principally unsaturated. The temperature of the conversion should be carefully controlled. Too high a temperature results in the production of normally liquid hydrocarbons useless for the purpose of this process, while too low a temperature results in the production of gaseous hydrocarbons of lower range than are required. A temperature as high as 440° C. has been found satisfactory with nickel apparatus. With glass lined apparatus, the temperature should be lower, say 375° to 400° C. Unconverted alcohol recovered from the cooler may be recycled through the conversion chamber, care being taken that the refluxing does not reduce the concentration in the vapourizer below 85% to 90%. Yields of 45% to 50% are obtained if the temperatures are maintained as previously stated. The pressure in the conversion chamber is approximately 700 mm. of mercury, being the subatmospheric pressure created by the gas and vapour passing through the cooler. The exact composition of the gas mixture thus obtained has not been accurately determined but is believed to be 35% to 40% 1.3-butadiene, some pseudo butylene and various other hydrocarbons. The composition of the gas mixture may be varied by using alternatives for the alcohol or ketone or by using various mixtures of materials of the types herein disclosed.

The catalyst now preferred for the conversion of the alkyl or alkylene containing body or bodies is alumina gel or silica gel or nickel powder, but any other catalyst known for the activation of vapour phase reactions of hydrocarbons, such as aluminum oxide (impure form) or zinc oxide (pure form), which will serve and which will not be detrimental to the final product may be used.

A thermosetting basic material suitable for use according to this invention, made from cotton linters as aforesaid, has, prior to hardening or vulcanization, the same colour and transparency characteristics as the thermoplastic material from cotton and is a slightly tacky, semi-solid which has no softening point and which commences to harden by polymerization when heated above 200° C. The specific gravity is 1.02 to 1.04 and the molecular refraction is 42.35. Thermosetting material made from wood flour, wood pulp or sawdust is yellowish to brown in colour and translucent to opaque and has other characteristics substantially the same as the material made from cotton. These thermosetting basic materials have high tensile strength, flexibility and elasticity. They are capable of being vulcanized with sulphur or other vulcanizing agents at temperatures of 220° to 235° C. to produce masses ranging from physically soft, very flexible and elastic to physically hard and rigid, according to the amount of vulcanizing agent used and the duration and intensity of the heating. The unpolymerized and unvulcanized thermosetting materials have the solubilities, insolubilities, compatibilities and incompatibilities hereinbefore stated for the thermoplastic materials but it is to be noted that the synthetic resins and ester gums tend to separate from the basic material during vulcanization. The vulcanized thermosetting basic materials are infusible and insoluble and are substantially unaffected by water, moisture, oils, greases, most acids, alkalis, gases, sunlight and oxygen. They have tensile strength, dielectric strength and conductance-inductance values superior to those of rubber.

The lacquer solutions of the invention are composed of either the thermoplastic basic material or the unvulcanized thermosetting basic material, each of which is admixed with some or all of lubricants, plasticizers, extenders, dyes, pigments, hardening agents, accelerators, anti-oxidants and other agents known in the lacquer industry, and dissolved in a suitable solvent, which term is to be understood as including both a single solvent and a solvent mixture. Lacquer solutions including the thermosetting basic material must, of course, include a vulcanizing agent.

The lacquer solutions may be applied by dipping, brushing or spraying and, on evaporation of the solvent, and in the case of those including a thermosetting basic material, on subsequent heating to vulcanize the same, form lacquer films which are in general very tough, pliable and elastic and have dielectric strength and specific conductance-inductance values superior to those of rubber. The films containing the thermoplastic basic material are thermoplastic and soluble in solvents for the thermoplastic material, such as those previously named. The films containing the thermosetting basic material are, after vulcanization, infusible and insoluble. The degree of toughness, flexibility and elasticity and the electrical characteristics depend to some extent on the identities and proportions of plasticizer, extender and any other agents which have been admixed.

The basic materials may be admixed with the previously mentioned types of materials, and with other materials, in a wide range of proportions, and also with solvents in a wide range of proportions, the identities and proportions of the admixed materials, including solvent, depending largely upon the solution viscosity and rate of evaporation desired and upon the use to which the films are to be put. For instance, 100 parts of either the thermoplastic basic material or the thermosetting basic material may be admixed with one or more of the following, the proportions being by weight:

½ to 2 parts of lubricant such as stearic acid, zinc stearate or aluminum stearate;

5 to 50 parts of plasticizer such as one or more of pine oil, hydrogenated pine oil, monobromated camphor, benzyl thiocyanate, dibenzyl amyl naphthalene, dibutyl ether, dibenzyl sebacate, dibutyl metacresol, dibutyl phthalate, dibutyl diphthalate, dioctyl phthalate, glycerol triacetate, tributyl glycerol naphthalate, tributyl acotinate, tributyl phosphate, tricresyl phosphate, phosphated castor oil, methyl abietate, ethyl abietate, ethyl recinoleate, glycerol chlorbenzoate, glycerol chlor-dibenzoate, glycerol monoisopropyl ether;

2 to 50 parts of an extender and lustering agent such as castor oil, linseed oil or soyabean oil, in each case with approximately 2% to 5% of the weight thereof of oleic acid or other suitable stabalizing or emulsifying agent;

1 to 50 parts of colouring agent or pigment, such as aniline dyes, P-33 exothermic black, Channel Black, carbon black, lead carbonate, titanium oxide;

5 to 50 parts of filler such as "Kalite," china clay, "Millimar," whiting;

½ to 5 parts of hardening agent such as magnesium oxide or zinc oxide, or both together, with a small percentage of retardant such as aluminum acetate if magnesium oxide is included;

½ to 5 parts of anti-oxidant such as chlorbenzoate, benzyl mercaptan or benzothiazyl disulphide;

½ to 5 parts of accelerator such as zinc oxide;

½ to 5 parts of dryers such as aluminum acetate, cobalt acetate, litharge, Japan drier;

which are mixed together using, if necessary, a wetting agent of suitable electrical properties such as methyl alcohol.

When the basic material used is of the thermosetting variety, there is further added from 1 to 3 parts of sulphur or other vulcanizing agent.

The mixture is dissolved in a suitable proportion, for instance 35% to 75% or more of its weight of solvent, which may include one or more of ethyl acetate, ethyl lactate, acetone, methyl ethyl ketone, methyl alcohol, benzene, xylene or toluene. Diluents may also be added. If it is desired that the films be transparent, the solvent should be non-polar, as polar solvents cause blushing or clouding of the film.

It will be understood the invention is not limited to the aforesaid admixed agents nor to the proportions thereof to one another or to the basic materials.

In making the lacquers of this invention, the method now preferred is to warm the basic material and reduce it to the consistency of a heavy paste by means of a roll mill or other suitable mixing machine, and then incorporate the plasticizer and any other agents except the solvent by thoroughly mixing them together until a completely homogenous mixture is obtained. The preferred warming and mixing temperatures are: for mixtures including the thermoplastic basic material, between 170° and 180° F., but not over 200° F.; and for mixtures including the thermosetting basic material, between 110° and 120° F., but not over 140 to 145° F. The larger the proportion of oil in the mixture, the lower the mixing temperature may be. Adequate cooling of the mixing apparatus is necessary as both the basic materials tend to heat rapidly during mixing.

When a completely homogenous mixture has been obtained, the mixture is held at elevated temperature and under closed vacuum until the plasticizer is so completely blended with the basic material that it will not separate during evaporation of the solvent from a solution of the mixture. The treatment now preferred is to hold the mixture under vacuum corresponding to a pressure of 15 to 20 inches of mercury, at a temperature of 140° to 150° F. for 30 to 60 minutes. The vacuum and the temperature may be somewhat lower or higher than stated above. This vacuum and heat treatment is important as it ensures proper blending of the components of the mixture and avoids brittling of the film owing to loss of plasticizer while the lacquer solution is drying to a film. For example, a film from a certain lacquer mixture which has not been vacuum treated will become brittle after 10 to 15 hours' exposure in a fadeometer, whereas films from the same mixture but which has been vacuum treated, do not become brittle under the same exposure.

On cooling, the mixtures are heavy pastes or semi-solids, according to the nature and amount of materials admixed with the basic materials. The mixtures, which may be regarded as heavy emulsions when oil is included, with fillers and pigments, if any, in suspension therein, are quite stable and may be stored for long periods of time, without deterioration, before being made up into solutions, providing they are kept at normal temperatures. The mixtures, immediately after manufacture or after storage, are dissolved in suitable proportions of suitable solvent or diluent, the suitability of proportion and solvent or diluent being determined by the viscosity and rate of evaporation desired and by the use to which the lacquer is to be put.

It will be understood the terms "solution" and "solvent" are used in a broad sense to designate, respectively, the fluid lacquers and the liquid agents serving to disperse the aforesaid pasty or semi-solid mixtures and form with them a fluid mixture capable of being applied by dipping, brushing or spraying. When oil is compounded with the basic material, it is believed the oil is emulsified with a part at least of the basic material, and that when the solvent is admixed, the emulsion is diluted thereby while unemulsified solubles go into solution. Insolubles such as fillers and pigments are, of course, merely in suspension in the solution or emulsion or mixture thereof, as the case may be.

Lacquers of reasonably high viscosity, unless they contain an unusually high proportion of insolubles or insolubles of high specific gravity, are sufficiently self-stabilizing for all practical purposes, that is, the suspended matter does not settle to greater extent in the lacquers of this invention than in known lacquers. The solutions of the solubles are completely stable if suitable solvents are used, and the basic materials do not separate from the other solutes.

It is a characteristic of the lacquers of this invention that they may contain relatively large amounts of oils and yet remain completely stable as paste mixtures, as liquids and as dry films if sufficient and suitable stabilizing or emulsifying agent is included. This characteristic distinguishes the lacquers of the invention from others having a base derived from cellulose.

After evaporation of the solvent, the films formed from solutions containing the thermoplastic basic material are ready for use, but films formed from solutions containing the thermosetting basic material must be vulcanized by heating the same at a temperature up to 150° to 200° C. for approximately 30 minutes if no filler or large proportion of pigment is included, and at a temperature up to 250° C. for the same time if fillers or large amounts of pigment are included.

Samples of dry lacquer films of the unplasticized basic material resist a load of 860 to 950 kilograms per square centimeter before breaking. The dielectric strength of the films has been found to be approximately 1850 volts per mil of thickness. For 60-cycle current and at a temperature of 25° C., the dielectric constant is 2.8 and the power factor is 0.0018 to 0.0034. The films are extremely flexible and have considerable elasticity, the vulcanized film produced from the thermosetting basic material being the more elastic of the two and having an elongation up to 900%, depending on the amount and identity of plasticizer, filler and vulcanizing agent and the duration and intensity of the vulcanizing treatment. The tensile strength and flexibility of the films including the thermoplastic basic material is substantially unchanged through a temperature range of 110° C. to −70° C., while the tensile strength of the vulcanized films including the thermosetting basic material is substantially unchanged through a temperature range of 400° F. to −40° F.

The toughness, tensile strength, flexibility and elasticity of the films make them particularly suitable as coatings on, or impregnating or adhesive material in, all bodies subject to flexion, expansion and contraction; while their electrical properties make them also valuable as electric insulation. The great toughness of the films renders them highly resistant to being scratched, cut or abraded when used as surface coatings. By use of sufficient and suitable hardening agent, or by limitation of plasticizer, or by regulation of the vulcanizing treatment, the films may be as hard as desired without sacrificing requisite toughness, flexibility and elasticity. The thermo-plastic basic material is tasteless and odourless and does not affect food products after long contact therewith, wherefore, films made from this material and not including unsuitable plasticizing or other agents, may be used as coating material on or impregnating material in containers for food.

The following examples are illustrative of the invention but it will be understood the invention is not limited to the ingredients or the proportions thereof given in the examples.

*Example 1.*—A lacquer mixture suitable for general use contents of, by weight: 100 parts thermoplastic basic material; 5 parts pine oil; 10 parts castor oil; 10 parts raw linseed oil; 1 part oleic acid and 30 parts dibutyl phthalate. The thermoplastic basic material is first warmed to about 140° to 145° F. and worked in a suitable mixing machine until a soft, homogenous consistency is attained. The other ingredients are then thoroughly admixed with the basic material in any suitable mixing machine at the above or at slightly lower temperature. The mixture is held under closed vacuum corresponding to the pressure of 15 to 20 inches of mercury, at the above temperature, for about 1 hour and is then allowed to cool. At any suitable time after cooling, the mixture is dissolved or dispersed in a suitable solvent or diluent, for instance, a mixture of 30 parts of ethyl acetate; 30 parts of ethyl lactate; 5 parts acetone and 10 parts of methyl ethyl ketone. The mixture, both without and with solvent, is absolutely stable and the oils do not separate from the other ingredients. The liquid lacquer may be applied by brushing, dipping or spraying. A film produced after evaporation of solvent is non-tacky and somewhat softer than ordinary lacquer film but is very tough, flexible and resistant to being scratched, cut or abraded. If made from a thermoplastic basic material derived from cotton, or from one derived from wood flour, wood pulp or sawdust and suitably decolourized, the film is substantially water-white and completely transparent. The film is thermoplastic and is soluble in most alcohols, esters, ethers, hydrocarbon and chlorinated hydrocarbon solvents. It is substantially unaffected by water, moisture, oils, greases, most acids, alkalis, gases and the action of sunlight and the atmosphere. It has substantially the electrical characteristics hereinbefore noted for the thermoplastic type lacquers of the invention.

*Example 2.*—The mixture of Example 1 is duplicated except that 30 parts of tricresyl phosphate is substituted for the dibutyl phthalate and a suitable amount of aniline dye is added. After treatment as in Example 1, a film may be obtained which is transparent and coloured and which does not support combustion.

*Example 3.*—A mixture of 100 parts of thermoplastic basic material; 1 part linseed oil; 0.1 part of oleic acid; 10 parts of dibutyl phthalate; 2 parts of zinc oxide and 0.5 part of cobalt acetate is made and treated as in Example 1. The film obtained is about as hard as a film of good floor varnish but is still tough and flexible.

*Example 4.*—A lacquer mixture suitable for general use, but which must be vulcanized, consists of, by weight: 100 parts of thermosetting basic material; 5 parts of pine oil; 10 parts of castor oil; 10 parts of raw linseed oil; 1 part of oleic acid; 1.5 parts of benzothiazyl disulphide; 1.5 parts of sulphur; 1 part of phenyl beta-naphthylamine and 30 parts of dioctyl phthalate. The mixture is made and treated according to the method of Example 1, excepting that the mixing temperature is 110° to 130° F. The blended mixture is dissolved in solvent the same as in Example 1. The mixture and the solutions thereof are stable. The liquid lacquer of this example is applied as in Example 1 and, after evaporation of the solvent, is heated in an oven for approximately 30 minutes at a temperature of approximately 150° C. to vulcanize the film. The resulting film is infusible and insoluble but in other respects has substantially the characteristics of the film obtained as in Example 1.

Electrical insulation including lacquer films and impregnations of the types herein referred to, is described and claimed in my co-pending application Serial No. 505,387 filed coincidently with this application; while coated materials and impregnations including lacquer films of the type herein referred to are described and claimed in my co-pending application Serial No. 505,386, filed coincidentally with this application.

Having thus described my invention, I claim:

1. A lacquer base comprising an unsaturated cellulosic derivative resulting primarily from treating a cellulosic ether substantially free from hydroxyl content under pressure with hydrogen until at least about 15% hydrogenation results and then condensing the mass with alcohol and an olefin having molecular weight from approximately 84 to approximately 112 and subsequently dehydrogenating the mass by refluxing at a temperature approximately equal to the highest boiling temperature of the alcohol until it becomes unsaturated; and a plasticizer for said derivative selected from among those known in the lacquer industry, which plasticizer has been incorporated to the derivative by mixing therewith at a temperature between 110° and 200° F. and holding under vacuum at a temperature of 140° to 150° F. for 30 to 60 minutes.

2. A thermoplastic lacquer base comprising an unsaturated cellulosic derivative resulting from treating a cellulosic ether substantially free from hydroxyl content under pressure with hydrogen until at least about 15% hydrogenation results and then condensing the mass with alcohol and an olefin having molecular weight from approximately 84 to approximately 112 and subsequently dehydrogenating the mass by refluxing at a temperature approximately equal to the highest boiling temperature of the alcohol until it becomes unsaturated, said derivative having a specific gravity of 1.14 to 1.16 and a molecular refraction of 28.62; and a plasticizer for said derivative selected from among those known in the lacquer industry which has been incorporated therewith by mixing the two together at a temperature between 170° and 200° F. and holding the mixture under vacuum at a temperature of 140° to 150° F. for 30 to 60 minutes.

3. A thermosetting lacquer base comprising an unsaturated cellulosic derivative resulting from treating a cellulosic ether substantially free from hydroxyl content under pressure with hydrogen until at least about 15% hydrogenation results and then condensing the mass with alcohol and an olefin having molecular weight from approximately 84 to approximately 112 and subsequently dehydrogenating the mass by refluxing at a temperature approximately equal to the highest boiling temperature of the alcohol until it becomes unsaturated and then reacting the mass with an unsaturated hydrocarbon gas prepared by catalytic treatment under pressure and at high temperature of a reagent selected from the group consisting of alcohols, aliphatic aldehydes and ketones, the said derivative having a specific gravity of 1.02 to 1.04 and a molecular refraction of 42.35; a plasticizer for said derivative selected from among those known in the lacquer industry which has been incorporated therewith by mixing at a temperature of 110° to 145° F. and holding the mixture under vacuum at a temperature of 140° to 150° for 30 to 60 minutes; and a vulcanizing agent for said derivative.

4. A process of making a lacquer base which process comprises mixing together at a temperature between 110° and 200° an unsaturated cellulosic derivative resulting primarily from treating a cellulosic ether substantially free from hydroxyl content with hydrogen under pressure until at least approximately 15% hydrogenation results and then condensing the mass with alcohol and an olefin having molecular weight from approximately 84 to approximately 112 and subsequently dehydrogenating the mass by refluxing at a temperature approximately equal to the highest boiling temperature of the alcohol until it becomes unsaturated, incorporating a plasticizer therefor selected from among those known in the lacquer industry by mixing at a temperature between 110° F. and 200° F.; and holding the mixture under vacuum at a temperature of 140° to 150° F. for 30 to 60 minutes.

JEAN B. MONIER.